United States Patent [19]

Ziegler

[11] Patent Number: 4,459,256
[45] Date of Patent: Jul. 10, 1984

[54] METHOD OF MANUFACTURING A PUSH BUTTON KEYBOARD

[75] Inventor: Horst R. A. Ziegler, Tyresö, Sweden

[73] Assignee: Telefonaktiebolaget LM Ericsson, Stockholm, Sweden

[21] Appl. No.: 360,326

[22] Filed: Mar. 22, 1982

[30] Foreign Application Priority Data

Apr. 19, 1981 [SE] Sweden .............................. 8102290

[51] Int. Cl.³ .............................................. B29H 7/04
[52] U.S. Cl. ...................... 264/152; 29/413; 29/416; 29/418; 29/453; 264/242; 264/255; 264/328.7
[58] Field of Search ............. 264/247, 152, 138, 255, 264/242, 272.17, 328.7, 264; 29/413, 416, 418, 453; 400/663; 235/145 R

[56] References Cited

U.S. PATENT DOCUMENTS

| | | | |
|---|---|---|---|
| 2,607,957 | 8/1952 | Danielson et al. | 264/328.7 |
| 3,100,929 | 8/1963 | Nisper | 29/416 |
| 3,489,342 | 1/1970 | Anderson | 235/145 R |
| 3,594,898 | 7/1971 | Lewandowski | 29/622 |
| 3,684,125 | 8/1972 | Laurizio | 220/27 |
| 4,057,710 | 11/1977 | Willmott | 235/145 R |
| 4,082,200 | 4/1978 | Guest et al. | 215/1 C |

OTHER PUBLICATIONS

Bixler, L. C., IBM Technical Disclosure Bulletin, vol. 16, No. 3, 1973, p. 954.
Duranske, R. G., IBM Technical Disclosure Bulletin, vol. 20, No. 9, 1978, p. 3614.

*Primary Examiner*—Donald E. Czaja
*Assistant Examiner*—Mary A. Becker
*Attorney, Agent, or Firm*—Roberts, Spiecens & Cohen

[57] ABSTRACT

A method of manufacturing one or more push buttons and an associated case in two work operations by injection molding. Button and case are molded in the first operation so that the button is integral with the case via two joining members formed on either side of the button. In the second operation a portion is molded under the button for contact with a connection mat or so-called "keypad", the portion being formed with locking lugs for limiting upward movement of the button after depression. Pressure is applied to the upper surface of the button to rupture the joining members and separate it from the case while operatively positioning the lugs with respect to lugs molded in the first step with the case.

6 Claims, 13 Drawing Figures

METHOD OF MANUFACTURING A PUSH BUTTON KEYBOARD

FIELD OF THE INVENTION

The present invention relates to a method of manufacturing a push button keyboard containing one or more push buttons, or keys, and in particular to the manufacture of the push button and the surrounding case for coaction with a contact system containing contact springs or a conductive rubber mat.

PRIOR ART

With the techniques used today, the push buttons are assembled, depending on their implementation, by fitting each individual button into its case manually or automatically. A covering panel or escutcheon is then attached over the push button set and constitutes guidance and protection for the buttons. U.S. Pat. No. 4,180,711 gives an example of this technique and relates to a push button mechanism for a pocket calculator.

SUMMARY OF THE INVENTION

An object of the present invention is to provide a method of manufacturing one or more push buttons and associated case (escutcheon), which facilitates assembling the final push button mechanism and also reduces assembly time.

The proposed method for achieving this object contemplates that both push button and case are commonly injection moulded using a plastic composition in two work operations in the mould. During the first operation, the push button or buttons are moulded so that they are combined with the escutcheon, there being moulded during the second operation the button symbols and the moulding pattern under each button, which shall coact with contact means for achieving contact when the buttons are depressed.

BRIEF DESCRIPTION OF DRAWINGS

The invention will now be described in detail while referring to the appended drawings, in which.

MODES FOR CARRYING OUT THE INVENTION

Figure 1:
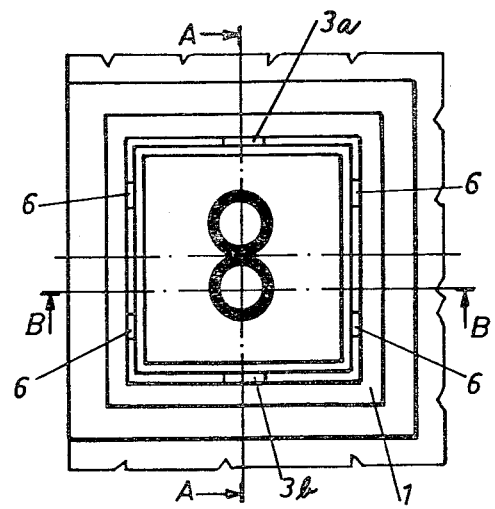
FIG. 1 illustrates a push button manufactured in accordance with the proposed method, and seen from above.

The structure of the push button and case (escutcheon) is described first (FIGS. 1–7), the manufacture of these in accordance with the proposed method is described in detail (FIGS. 8–11) subsequently. FIG. 1 schematically illustrates a push button where the numeral 2 denotes the button itself and 1 the surrounding case, which forms a covering panel or escutcheon for the button. Between the button 2 and case 1 there are joining means in the form of locking lugs 6 on opposing sides of the button and connection means 3a, 3b on either side of the button 2. A symbol "8" on the upper side of the button is moulded into the button 2.

Figure 2:
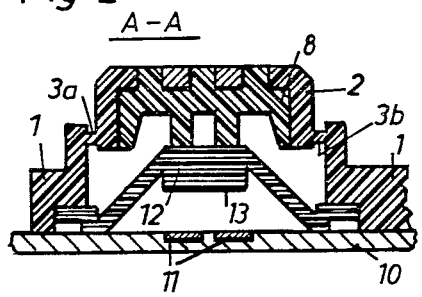
FIGS. 2, 3 are sections A—A and B—B in FIG. 1, and illustrate the push button and the surrounding case after manufacture.
Figure 3:
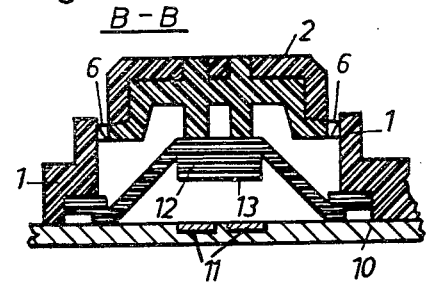
Figure 4:
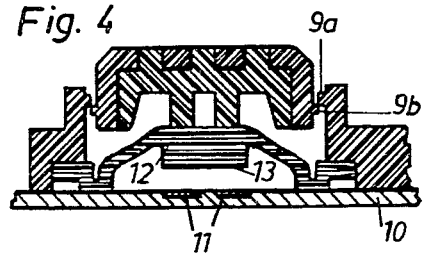
FIGS. 4 and 5 illustrate, in the same sections, the push button and case in an inactive position after separating the button from the case.

FIGS. 2 and 3 illustrate the push button mechanism according to sections A—A and B—B in FIG. 1, after manufacturing the case 1 and button 2. A rubber mat is laid on a circuit card 10 under the casing 1. The mat has a raised cupola-shaped part 12, the underside of which is covered with a layer 13 of conductive material, usually conductive carbon. Mats of this kind are known as "keypads" (connection mats) and are sold by the Swiss firm of "Gummi-Maag". On the circuit card 10 under the layer 13 a pair of conductors 11 are arranged by printed circuit technique, the cupola-shaped part being deformed when the button is depressed, and upon complete depression, the conductors 11 are bridged by the layer 13, see FIGS. 4 and 6. As will be seen from FIG. 2, the case 1 and button 2 are kept together by the joining means 3a, 3b, thus forming a cohesive part immediately after moulding. The joining means are not cohesive after moulding, and can glide along their respective chamfered surfaces on depression of the button 2 to form a stop, as will be apparent from FIG. 3.

Figure 5:
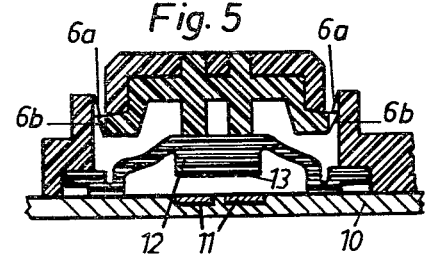
Figure 6:
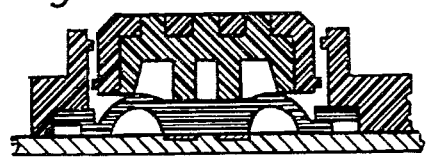
FIGS. 6 and 7 illustrate the button in the contact position, using the same sections.
Figure 7:
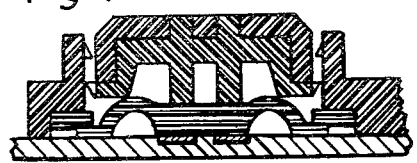

In FIGS. 3, 5 and 7 the push button mechanism is illustrated along the section B—B in FIG. 1. In this section the case 1 and push button 2 are kept together with the aid of joining means 6, which, by cutting, form two locking lugs 6a, 6b as indicated in FIG. 5. As with FIG. 6, FIG. 7 illustrates the position of the push buttons during complete depression. The locking lugs 6a on either side of the button are suitably moulded in the same moulding sequence as the case 1, while the lugs 6b are moulded in the same operation as the central means 8 of the button. The appearance of the locking lugs 6a, 6b are shown in detail in FIG. 12.

Figure 8:
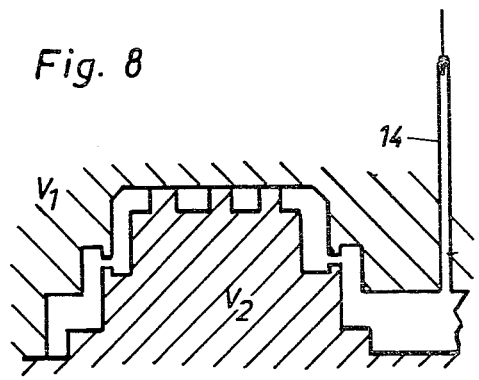
FIGS. 8 and 9 are sections of both mould halves utilized in the method in accordance with the invention in the first operation, and FIGS. 10 and 11 analogously illustrate the mould halves during the second work operation.
Figure 9:
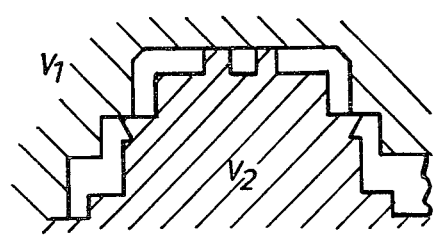
Figure 10:
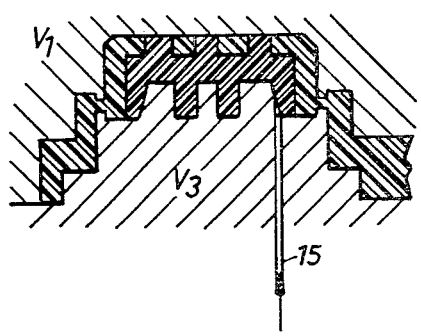
Figure 11:
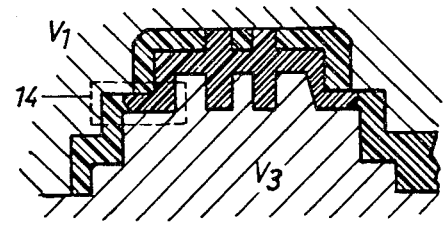

FIGS. 8–11 show in detail the profiles of the parts incorporated in the injection mould used in moulding the button and case. In FIG. 8 the profile of the mould part $V_1$ is fixed and against it there engages a first half $V_2$ so that a cavity is provided, the profile of which corresponds to that of the push button and case. A plastic composition is injected via a tube 14 in the mould part $V_1$, in the direction of the arrow, at high pressure and the cavity is filled. FIG. 8 illustrates the mould profiles along a section corresponding to the section A—A in FIG. 1, and FIG. 9 illustrates the same mould in a section corresponding to the section B—B. In FIG. 10 the mould part $V_1$ is unchanged as well as the now fused and ready moulded case-button portion, but the part of the tool containing $V_2$ has been turned 180° so that a second tool half $V_3$ engages against the case-button part instead, and so that a given empty space corresponding to the central section 8 is formed. When plastic is injected through the tube 15, this plastic being of the same kind but of another color compared to the plastic of the case-button part, the central section 8 is thus formed and therewith button symbols and surfaces engaging against the cupola-shaped portion of the rubber mat according to FIG. 2. FIG. 11 illustrates the mould part $V_1$, mould half $V_3$ and the injected plastic composition in a section corresponding to the section B—B in FIG. 1.

In the described embodiment, the injection moulding of only one button and the contiguous case has been described. It is naturally possible to injection mould all the buttons, eg 4×3=12 buttons, in a button or key set in accordance with the proposed method.

After injection moulding, when the button (or buttons) and case together with the rubber mat have been assembled on the circuit board, as will be seen from FIGS. 2 and 3, pressure is brought to bear on the upper surface of the buttons. This results in the rupture of the narrow joining lugs, so that corresponding parts 3a, 3b and locking lugs 6a, 6b are formed. The button is then in its inactive position according to FIGS. 4 and 5, and the cupola-shaped part 12 of the rubber mat urges the button upwards simultaneously as it is locked against the flat upper and under surfaces of the lugs 6a and 6b respectively. The cohesive case-button portion has outer edges which are conventionally formed so that the part can be snapped together with the underlying circuit card after the rubber mat has been put in place.

Figure 12:
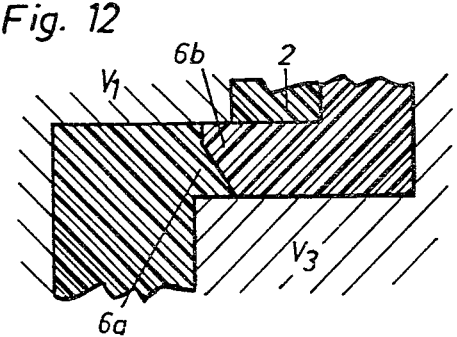
FIGS. 12 and 13 illustrate two different embodiments of the stop mechanism of a push button manufactured in accordance with the proposed method.

An enlarged portion of the dotted outline 14 in FIG. 11 is shown in FIG. 12. Both lugs 6a, 6b are not moulded to each other after both injection operations (FIGS. 8, 9 and 10, 11), and the upper chamfered surface of the lug 6a can glide against the lower chamfered surface of lug 6b. The lugs 6a, 6b can therefore be said to form a snap-on joint when the button 1 is pressed downwards, and after this depression the upper (horizontal) surface of 6b bears against the lower surface of 6a.

Figure 13:
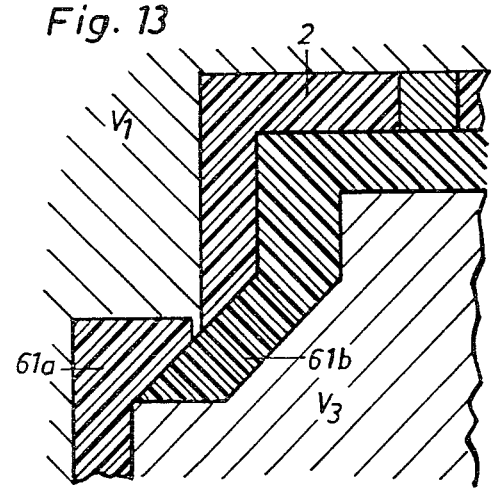

FIG. 13 illustrates an alternative embodiment of the locking lugs 6a, 6b. One lug 61a has a flat and chamfered lower side surface formed by injection moulding during the first work operation, by the mould part, $V_1$ and half $V_2$. During the second operation the lug 61b is formed as a fairly narrow dependent tongue, the lower portion of which, as will be seen from the Figure, engages with its upper chamfered surface against the lower chamfered surface of the lug 61a.

Separation of the button or buttons from the case can be effected other than that described above, eg by stamping or cutting by supersonic means. The same plastic material can be used for injection during both work operations. Possible fusing together of locking lugs 6a and 6b is prevented by allowing the plastic to cool for a short time between operations. Alternatively, plastics of different melting temperatures can be used for the two operations.

What we claim is:

1. A method of manufacturing a keyboard push button and associated case comprising injection molding a first part of a keyboard push button and a surrounding case for the push button in a first working operation in which said first part of the button and case are integrally joined at the top of the case by breakable joining elements, and the case is formed at its inner periphery with one portion of a locking lug, injection molding in a second operation, subsequent to the first operation, a second part of the push button to complete the push button and a second portion of the locking lug, projecting outwardly from the second part of the button, mounting a circuit card on the bottom of the case and a resilient mat on the card in engaging relation with the push button preventing removal of the push button from the bottom of the case, and displacing the push button downwardly in the case to rupture the breakable joining elements and displace said second portion of the locking lug on the push button relative to the first portion of the locking lug on the case such that the first and second portions of the locking lugs are positioned to interfere with one another to prevent separation of the push button from the top of the case whereas the push button is still displaceable downwardly in the case against the resilient action of the resilient mat.

2. A method as claimed in claim 1 wherein the push button is displaced in the case to rupture the breakable lugs and displace the locking lugs by pressing against the upper surface of the push button.

3. A method as claimed in claim 1 wherein respective parts of a plurality of push buttons are integrally molded in the case in said first working operation.

4. A method as claimed in claim 1 wherein the second molding operation is carried out after the injected material in the first operation has cooled.

5. A method as claimed in claim 1 wherein a plurality of said locking lugs are arranged in respective opposed locations at the periphery of said push button.

6. A method as claimed in claim 1 wherein a central portion of the push button beneath the upper surface thereof represents a part of said second part of the push button and is joined to the first part of the push button in said second operation.

* * * * *